Feb. 21, 1956     W. R. GEMMEL     2,735,526
POSITIVE ENGAGING CLUTCH
Filed Oct. 2, 1951
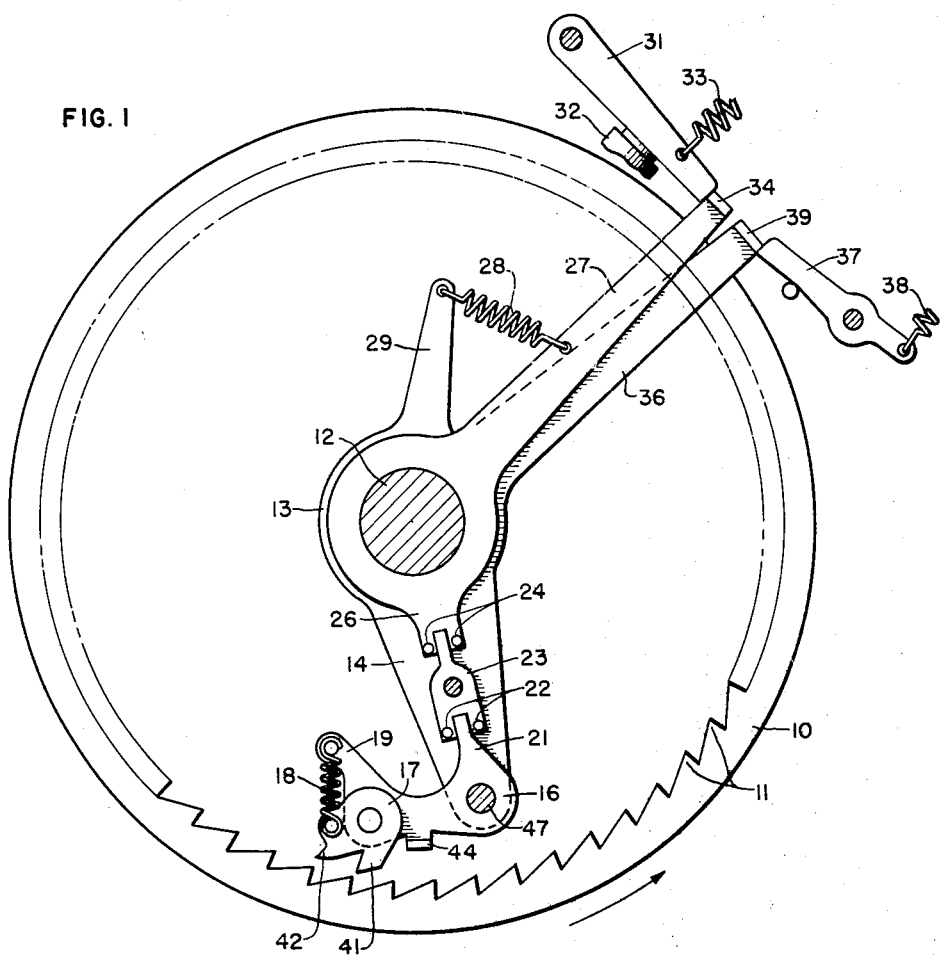
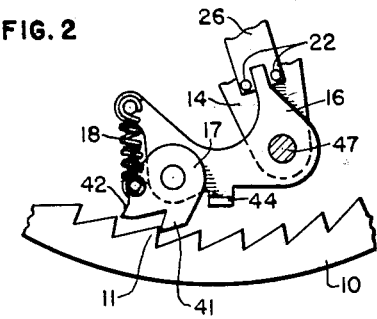
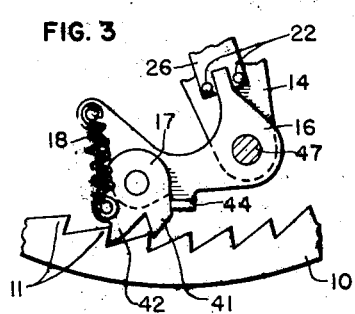
INVENTOR
WILBUR R. GEMMEL
BY *Emery Robinson*
ATTORNEY

United States Patent Office 2,735,526
Patented Feb. 21, 1956

2,735,526

POSITIVE ENGAGING CLUTCH

Wilbur R. Gemmel, Wheaton, Ill., assignor to Teletype Corporation, Chicago, Ill., a corporation of Delaware Application October 2, 1951, Serial No. 249,280

12 Claims. (Cl. 192—28)

This invention relates to a positive engaging clutch and more particularly to an arrangement of two clutching elements which ensures the full engagement of one of the clutching elements during high speed transmission of rotative power.

In clutches used in start-stop telegraph apparatus, it is of paramount importance that the clutch elements instantaneously engage and further, that such engagement be maintained without subsequent slippage during the operation of the telegraph apparatus. Heretofore, clutches employed in telegraph apparatus have primarily been of the friction disc type. Positive engaging clutches do not readily adapt themselves to incorporation in telegraph apparatus because there is a tendency for existing clutches to slip during the initial portion of the engaging operation. This impediment is especially perceptible in clutches wherein a toothed engaging member mounted on a driven member is brought into an engagement with a toothed driving member. The result of such an engagement at high speed operation has been that the toothed engaging member hangs up or is retained in the vicinity of the engaged tip of the tooth on the driving member, resulting in only a partial engagement of the toothed members during the period in which the clutch is engaged. This partial engagement of the toothed clutching members has resulted in a severe strain being placed on the tips of the teeth causing said teeth to ultimately fracture or chip. It has also been observed that when the toothed clutch members have been partially engaged, the clutch members tend to bounce or deflect from engagement, consequently, slippage has resulted between the driving and driven toothed members.

The present invention though described in relation to an application in telegraph apparatus is not to be construed as limited to such an application because the clutch can be advantageously utilized in various other types of apparatus wherein it is desired to obtain an instantaneous clutching action without subsequent slip or breakage of the clutch members.

It is one of the primary objects of this invention to provide a clutch wherein a full positive engagement is secured between the clutch elements without subsequent fracturing or chipping of the elemental parts.

It is a further object of this invention to provide a toothed clutch wherein a positive clutching action takes place instantaneously upon release of the clutch and that said positive clutching action continues during the subsequent engagement of the clutch members.

Still another object of this invention is to provide a clutch wherein a first toothed member is brought into engagement with a tooth on a driving member to initiate the movement of a second toothed member into full engagement with another tooth of the driving member.

With these and other objects in view the present invention contemplates a driving member in the form of a flanged disc having a plurality of serrations or teeth formed on the inner peripheral surface of the flanged portion of the disc. Positioned within the flanged portion of the disc and spaced therefrom is a portion of a driven member. A two-toothed pawl is rotatedly mounted on the driven member and is maintained in a disengaged position by a suitable linkage mechanism which is controlled by a selector magnet associated with a start-stop telegraph apparatus.

Operation of the clutch is initiated by reception of a start signal in the start-stop magnet which actuates the linkage mechanism to move one of the teeth on the two-tooth pawl into engagement with a tooth formed on the flanged portion of the driving member. This engagement of the toothed elements results in a pivoting of the two-tooth pawl to bring the second one of the teeth on the two-tooth pawl into engagement with the next succeeding tooth formed on the driving member. The circular pitch of the teeth formed on the flanged driving disc is slightly greater than the distance between the engaging faces of the teeth on the two-tooth pawl, hence allowing the second tooth to pivot within the full depth of a space between two adjoining teeth on the driving member. Resilient means are provided to normally hold the pawl out of engagement with the toothed drum and to resist the pivotal movement of the two-tooth pawl. However, the inertia of the driven member and the momentum of the driving member are sufficient to overcome the effects of the resilient means to permit the pivoted movement of the two-tooth pawl. Consequently, the two-tooth pawl pivots until the second tooth is brought within the full depth between a pair of teeth formed on the driving member. Further pivotal movement of the two-tooth pawl is arrested and the driving force of the driving member is transferred from the first to the second engaged tooth on the two-tooth pawl.

Other objects and advantages of the present invention will be apparent from the following detailed description when considered with the accompanying drawing wherein:

Fig. 1 discloses a front elevational view of a positive engaging clutch embodying the principal features of the invention; and, Figs. 2 and 3 are side elevational views of a portion of the clutch shown in Fig. 1 disclosing the toothed engaging members during two different stages of a cycle of operation.

Referring to the drawing and more particularly to Fig. 1, there is disclosed a driving drum 10 continuously rotated by a suitable source of rotative power, such as a motor. The drum has formed along its inner peripheral surface a plurality of serrations or teeth 11. Securely mounted on a driven shaft 12, is a driven member 13 and pivotally secured to an extension 14 thereon, is an actuator link 16. Connection between the toothed driving member 10 and the driven member 12, is obtained through the instrumentality of a two-toothed pawl 17 pivotally mounted on the actuator link 16. The pawl 17 is retained from engagement with the tooth 11 by a spring 18 which interconnects the pawl 17, and a projecting portion 19 of the actuator link 16.

The actuator link 16 is provided with a second projecting portion 21 which is fitted between a pair of spaced pins 22, secured to one end of a pivotally mounted link 23. The other end of the link is tapered and is positioned between a pair of studs 24 secured to an extension 26, forming part of an operating lever 27. The operating lever 27 is urged in a counterclockwise direction, as viewed in Fig. 1 by a spring 28 connected between the operating lever 27 and an extending portion 29 of the driven member 13. A pivotally mounted armature 31 is urged by a solenoid or selector magnet 32 against the effect of a spring 33 into engagement with a dog 34 formed integral with the operating lever 27 to retain said operating lever 27 in position against the effect of the spring 28.

The driven member 14 has an extending portion 36 projecting beyond the periphery of the driving drum 10. A pivotally mounted latch 37 is urged by a spring 38 into engagement with a dog 39 formed integral with the extending portion 36 of the driven member 14. The latch 37 is provided to engage the dog 39 to prevent retrograde movement of the clutch elements upon engagement of the dog 34 with the armature 31 which occurs whenever the clutch elements are disengaged.

In operation of this embodiment of the clutch an initiating telegraph signal, which is a no-current or spacing impulse, is received by the selector magnet 32 to release the armature 31 from engagement with the dog 34. Instantaneously the spring 28 pivots the operating lever 27 about the driven shaft 12 to move the extending portion 26 in a counterclockwise direction. Movement of the extending portion 26 is imparted to the actuator 21, through the instrumentality of the link 23, the end result being the movement of the actuator 21 in a counterclockwise direction to move a first tooth 41 of the two-tooth pawl 17, into engagement with a tooth 11 (see Fig. 2) of the driving drum 10. The driven member being at rest, the momentum of the driving drum 10 will tend to further pivot the pawl 17 against the action of its retaining spring 18. The pivotal movement of the two-tooth pawl 17 will continue until the inertia of the driven members is overcome, at which time the driven members will be picked up and carried by the driving drum 10. As the two-tooth pawl pivots, a second tooth 42 is pivoted into the space formed between two adjacent teeth 11 of the drum 10 (see Fig. 3). The circular pitch of the teeth 11 is slightly greater than the distance between the engaging faces of the teeth 41 and 42 of the two-tooth pawl 17. Therefore, sufficient clearance is provided to permit the second tooth 42 to pivot fully within the depth between the two adjoining teeth 11 without possibility of the tooth 42 striking the tooth 11 before said tooth 42 is fully seated within the space between the adjoining teeth.

Pivotal movement of the two-tooth pawl 17 will continue unabated until the tooth 42 is fully seated within the space between the teeth 11. A detent 44 integrally formed on the actuator 16 is provided to project into the orbit of the pivotal movement of the toothed pawl 17. This detent 44 is located on the actuator in such a position that further pivotal movement of the two-tooth pawl 17 is prevented simultaneously with the movement of the second tooth 42 into the full depth between the pair of adjacent teeth 11. Concurrent with the arrest of the pivotal movement of the two-tooth pawl 17 by the detent 44, a tooth 11 is moved into engagement with the face of the tooth 42 whereby the driving connections between the driving and driven members is transferred from the first tooth 41 to the second tooth 42.

The spring 18 acts to resist the pivotal movement of the two-tooth pawl 17 during the engagement of a tooth 11 with the first tooth 41, thus easing the shock of initial engagement of the two elements. During the pivotal movement of the two-tooth pawl 17 by the interaction between a tooth 11 and the tooth 41, the inertia of the driven member is gradually overcome by the momentum of the driving member 10. It may be thus appreciated that when the driving force is transferred from the tooth 41 to the tooth 42, the driven members are rotating at approximately the same speed as that of the driving member 10, and consequently any possibility of detrimental shock being imparted to the pawl 17 is eliminated.

The ultimate driving condition when the tooth 42 is fully positioned between a pair of adjacent teeth 11 is illustrated in Fig. 3. Thereafter the driving connection between the clutch elements may be traced from the driving drum 10 through a tooth 11, to the tooth 42, through the actuator detent 44, to the actuator link 16, and hence through its pivotal mounting pin 47, to the driven member 13.

In order to disengage the clutch, a current or marking impulse is received by the selector magnet 32 whereupon the magnet attracts its armature 31 to move into position to engage the dog 34. The driven member 13 continues to rotate, and as a consequence, the actuator link 16 is rotated about driven shaft 12 relative to the operating lever 27. The operating lever 27 being held stationary causes the link 23 to pivot counterclockwise, hence moving the actuator link 16 in a clockwise direction about its pivot 47. Pivotal movement of the actuator link 16 withdraws the two-tooth pawl 17 from engagement with the tooth 11 on the driving drum 10, thus disrupting the train of power from the driving member 10 to the driven member 13. The momentum of the driven member 13 continues to carry the driven parts in a counterclockwise direction until the spring 28 is extended to such an extent that the effect of the momentum is overcome by the spring whereupon there is a tendency for the driven members to retrogress. The retrogressive movement of the driven member is prevented by the latch 37 which drops into position behind the dog 39 subsequent to the dog passing the latch 37.

In summary thereof, it may be appreciated that the initial engagement between the tooth 41 and the tooth 11 need only be a partial engagement as shown in Fig. 2. However, since the pawl 17 is pivotally mounted, the pawl rides with a tooth 11 without a shock being imparted to the tips of the tooth 41 and the engaged tooth 11, therefore, the possibility of said teeth chipping or fracturing is relatively remote since the strain encountered in such teeth is at a minimum. It is not until the second tooth 42 is fully positioned between a pair of teeth 11 that the full driving load is eventually transferred to this second tooth and as such engagement is at the full depth of the tooth 11, the driving force is dissipated over a relatively wide area resulting in a lower stress being applied to the tooth 11 than the stress applied to a partially engaged tooth.

It is to be understood that the above described arrangements of apparatus and construction of clutch elements are simply illustrative of an application of the principles of the invention and many other modifications may be made without departing from the spirit and scope of the invention. It is to be particularly noted that the embodiment heretofore described sets forth only a single pawl 17, but it is easily within the providence of any one skilled in the art to provide additional pawls and associated actuating instrumentalities for simultaneously moving a plurality of pawls into clutching position in a manner substantially similar to the described movement of the single disclosed pawl 17.

What is claimed is:

1. In a positive engaging clutch, a multi-toothed driving member, a driven member, a link movably mounted on the driven member, a two toothed pawl pivotally mounted on the link, means for moving the link to bring a first tooth of the two toothed pawl into engagement with a tooth on the driving member, whereby the inertia of the driving member acts to pivot the pawl to move the second tooth of the pawl into engagement with another tooth on the driving member so that the driving force is imparted through this second tooth to the driven member.

2. In a positive engaging clutch, a driving drum having a plurality of teeth formed along its inner peripheral surface, a driven member, an actuator pivotally mounted on the driven member, an engaging member pivotally mounted on the actuator, said engaging member having two engaging abutments formed thereon, and means for pivoting the actuator to move one of the engaging abutments into engagement with a tooth on the driving drum, said engagement causing further pivotal movement of the engaging member relative to the actuator to bring the other engaging abutment into full engagement with another tooth on the drum.

3. In a positive engaging clutch, a constantly moving multi-toothed driving member, a driven member, an actuator pivotally mounted on the driven member, a two toothed pawl pivotally mounted on said actuator, resilient means for positioning the two toothed pawl on the actuator, and means for pivoting the actuator to move one of the teeth on the two toothed pawl into engagement with a tooth on the driving member, said movement of the driving member being imparted to the pawl to pivot the pawl against the force of the resilient means to move the other tooth of the pawl into full engagement with another tooth on the driving member.

4. In a positive engaging clutch, a multi-toothed rotatable driving member, a driven member, an arm pivotally mounted on the driven member, a two toothed pawl pivotally mounted on the arm, a spring interconnecting the pawl and the arm for maintaining the pawl in a rest position, means for pivoting the arm to bring one tooth of the two toothed pawl into engagement with a tooth on the driving member, said toothed driving member being adapted to rotate to pivot the two toothed pawl against the force of the spring to bring the second tooth of said two toothed pawl into full engagement with the face of another tooth on the driving member, and means for limiting the pivotal movement of the two toothed pawl by the driving member, whereby the second tooth of the two toothed pawl is maintained in full engagement with the engaged tooth of the driving member.

5. In a positive engaging clutch, a multi-toothed driving member, a driven member, an actuator movably mounted on the driven member, a first engaging member pivotally mounted on the actuator, a second engaging member, adapted to be moved with the first engaging member, an operating lever for moving the actuator to bring the first engaging member into engagement with a tooth on the driving member whereby the first engaging member pivots to move the second engaging member into full engagement with the face of another tooth on the driving member, means adapted to move the actuator to disengage the second engaging member from an engaged tooth, and means connected to the second engaging member for returning both engaging members to an initial rest position upon said second engaging member being disengaged from the tooth of the driving member by said actuator.

6. In a positive engaging clutch, a driving member having a plurality of equally spaced abutments projecting therefrom, a driven member, an actuator pivotally mounted on the driven member, a first engaging member pivotally mounted on the actuator, a second engaging member, said engaging members being spaced a distance slightly less than the space between two abutments, and means for pivoting the actuator to bring the first engaging member into engagement with one of the abutments on the driving member, said engagement effectuating the pivotal movement of the second engaging member into engagement with the next succeeding abutment on the driving member whereby the driving power of the driving member is transferred from the first engaging member to the second engaging member.

7. In a positive engaging clutch, a rotating driving drum having a plurality of teeth formed along its inner peripheral surface, a driven member, a two toothed pawl pivotally mounted on the driven member, means for urging the toothed pawl out of engagement with the teeth of the driving drum, means for moving the two toothed pawl toward the teeth of the rotating driving drum to engage one of the teeth of the pawl, said engagement effecting a pivoted movement of the pawl by the rotating engaged tooth to move the other tooth of the pawl against the effect of the urging means within the full depth of the next succeeding tooth formed in driving drum.

8. In a positive engaging clutch, a driving drum having a plurality of teeth formed along its inner peripheral surface, a driven member, an actuator link pivotally connected to said driven member, a two toothed pawl pivotally connected to the link, a spring connected at one end to the pawl and at its other end to the link for urging the two toothed pawl out of engagement with the teeth of the driving drum, and means for pivoting the link to bring a first one of said teeth on the two toothed pawl into engagement with a tooth formed on the inner peripheral surface of the driving drum, said engagement effecting a pivotal movement of the pawl against the action of the spring whereby the second tooth of the pawl is moved fully within the depth of the next succeeding tooth on the inner peripheral surface of the driving drum.

9. In a positive engaging clutch, a constantly rotating driving member having a plurality of teeth formed thereon, a driven member, an actuator link movably mounted on the driven member, a multi-toothed pawl pivotally mounted on the actuator link, resilient means interconnecting the pawl and actuator link, means for moving the actuator link to move one tooth of the pawl into engagement with a tooth on the driving member, said engaged tooth of the rotating driving member causing the pawl to pivot against the effect of the resilient means to bring another tooth thereon into engagement with another tooth on the driving member, and means for limiting the pivotal movement of the pawl when the driving force is transferred from the first engaged tooth to the second engaged tooth.

10. In a positive engaging clutch, a rotating driving member having a plurality of teeth formed thereon, a driven member, an operating lever movably mounted with respect to the driven member, a spring interconnecting the driven member and the operating lever, means for holding the driven member and operating lever in position to extend the spring, an actuator mounted on the driven member, a two toothed pawl mounted on the actuator, means for releasing the holding means to allow the movement of the operating lever, means for transferring the movement of the operating lever to the actuator to move the actuator toward the teeth on the driving member, said movement of the actuator carrying one tooth of the two tooth pawl into engagement with a tooth on the driving member, the inertia of the driven member and the momentum of the driving member being sufficient to pivot the two toothed pawl to bring the second tooth thereon into engagement with another tooth on the driving member.

11. In a clutch, a moving driving member, a driven member, an actuator movably mounted on the driven member, an engaging member having two engaging surfaces formed thereon, means for movably mounting the engaging member on the actuator so that both said engaging surfaces may be moved into engagement with said driving member, means for holding said engaging member in position so that one of said engaging surfaces is closer than the other to said driving member, and means for moving said actuator to move said closer engaging surface into engagement with said moving driving member whereby said moving driving member moves said engaging member against the action of the holding means to bring the other of said engaging surfaces into engagement with said driving member.

12. A clutch comprising a first member, a second member having a plurality of evenly spaced teeth thereon, a two toothed pawl articulatively mounted on said first member for movement about two axes of rotation, means for holding the pawl in position so that a first one of said teeth on said two toothed pawl is in closer proximity than the other to the teeth on the second member, and means for pivoting the pawl about a first one of said axis of rotation to bring said first tooth on the pawl into engagement with a tooth on said second member whereby relative movement between said members causes the pawl to pivot about the other axis of rotation thereby moving the second tooth on the pawl into engagement with another tooth on said second member.

(References on following page)

References Cited in the file of this patent

UNITED STATES PATENTS

| | | |
|---|---|---|
| 138,493 | Fritts | May 6, 1873 |
| 283,801 | Miller | Aug. 28, 1883 |
| 1,192,489 | Anglada | July 25, 1918 |
| 1,737,907 | Arnold | Dec. 3, 1929 |
| 2,202,402 | Rueb | May 28, 1940 |
| 2,224,322 | Sinclair | Dec. 10, 1940 |
| 2,407,558 | Kress | Sept. 10, 1946 |
| 2,577,199 | Klopner | Dec. 4, 1951 |
| 2,627,945 | Hooker | Feb. 10, 1953 |